Feb. 3, 1970          B. L. McCALL          3,493,196
AIRPLANE FLAP ASSEMBLY
Filed Jan. 24, 1968          2 Sheets-Sheet 1
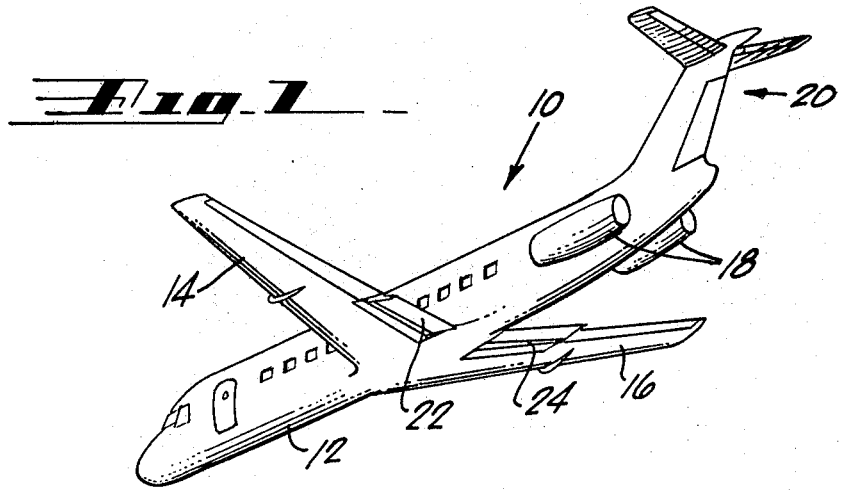
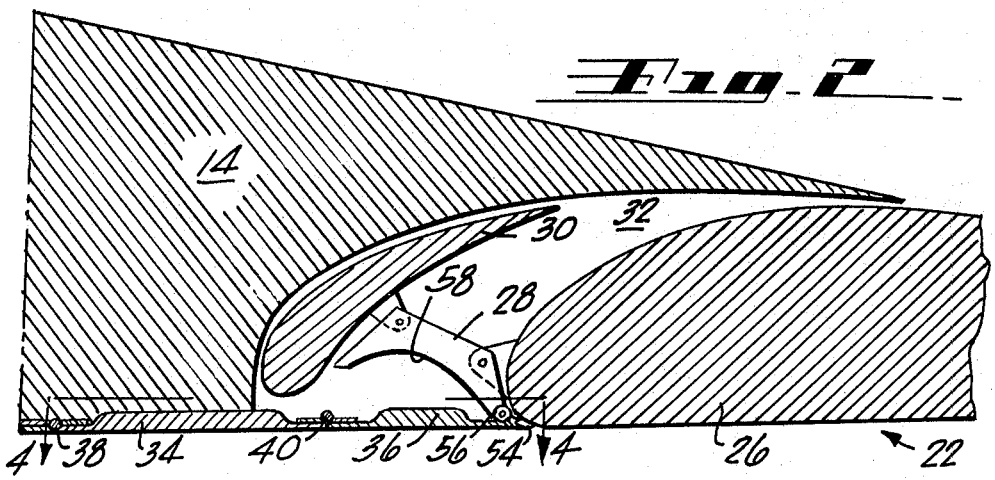
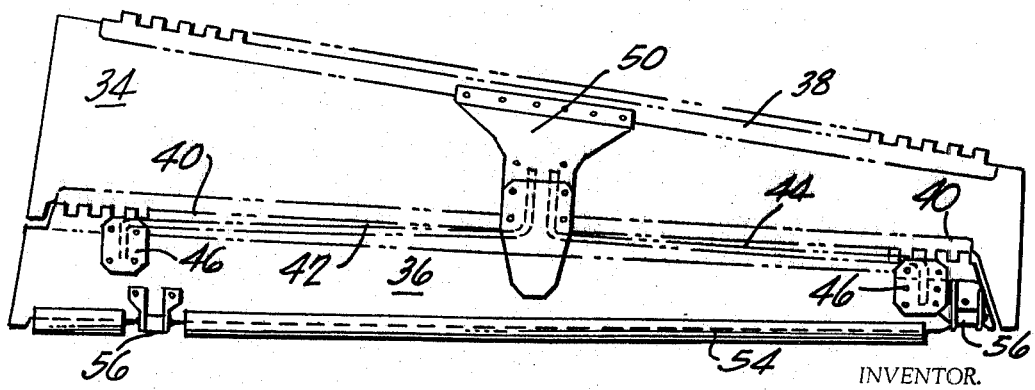
INVENTOR.
BENJAMIN L. McCALL
BY
AGENT Feb. 3, 1970  B. L. McCALL  3,493,196
AIRPLANE FLAP ASSEMBLY
Filed Jan. 24, 1968  2 Sheets-Sheet 2
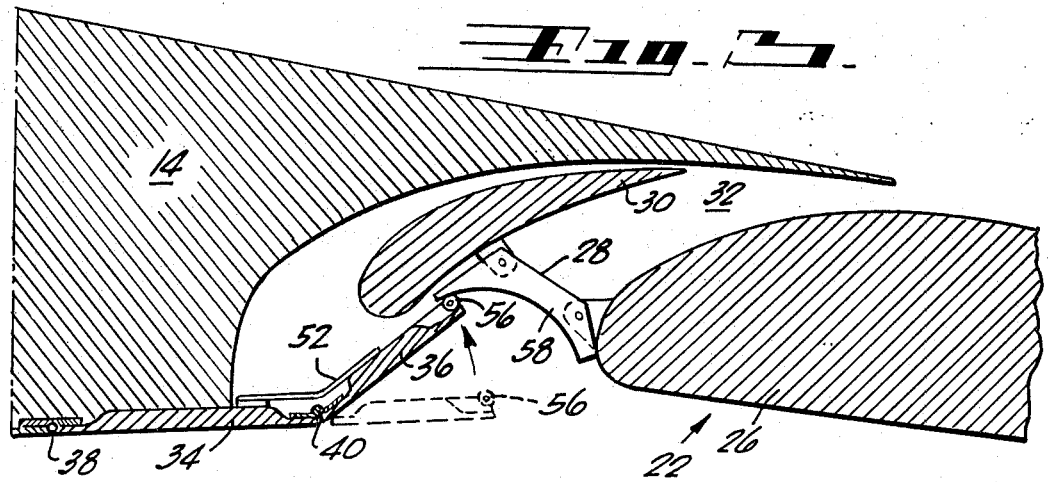
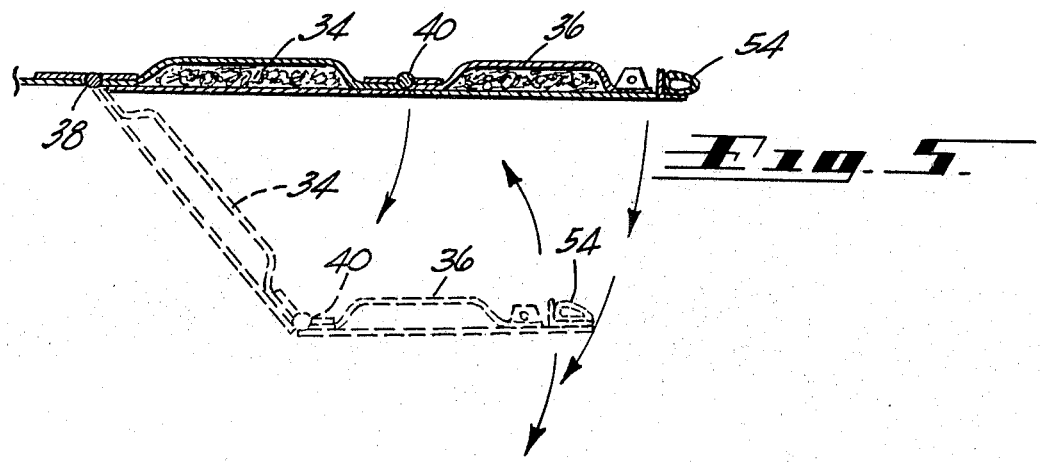
INVENTOR.
BENJAMIN L. McCALL
BY
- AGENT -

United States Patent Office 3,493,196
Patented Feb. 3, 1970

3,493,196
AIRPLANE FLAP ASSEMBLY
Benjamin L. McCall, Redondo Beach, Calif., assignor to McDonnell Douglas Corporation, a corporation of Maryland
Filed Jan. 24, 1968, Ser. No. 700,067
Int. Cl. B64c 9/38
U.S. Cl. 244—42          3 Claims

ABSTRACT OF THE DISCLOSURE

A double slotted flap assembly for an aircraft wing wherein the supporting member between the vane and flap functions as a cam for the cove lip door to deflect thereby causing increased air flow. The cove lip door is under a constant bias to the deflected position.

Background of the invention

With the advent of the subsonic airplane, it was discovered that the single type of flap employed on the trailing edge of the aircraft wing had certain disadvantages in the higher speed aircraft. It was desirable to design a flap assembly where substantial air braking could be achieved without a substantial loss of lift. It was found that, if the forwardmost portion of the flap itself were slotted so as to permit the passage of air therethrough, an increase in lift would be achieved with the flap assembly still accomplishing the desired braking of the airplane. In such a flap assembly the forwardmost portion of the flap is usually referred to as a vane. The vane is connected to the main flap portion through a plurality of supporting brackets. The hiatus formed between the vane and the flap is sufficient to permit a substantial air flow therethrough.

With the flap assembly up and in the non-actuated position, it is desirable that the lower edge of the wing should form a continuous surface between the wing structure and the flap structure. This means that the lower surface of the wing must extend past the vane and abut the flap itself forming such a continuous surface. However, with the flap actuated and performing its function as an air brake, the portion of the wing surface directly adjacent the flap will substantially hinder the passage of air flow through the hiatus between the vane and the flap. It has been found to be a necessary requirement that, when an aircraft employs a double slotted flap assembly, the portion of the wing skin nearest the flap is formed into a door which will deflect upwardly and permit passage of air through the hiatus of the slotted flap assembly. Such a door is commonly referred to as a cove lip door.

Heretofore, many types of actuating mechanisms have been designed to deflect the cove lip door. Hydraulic or pneumatic actuating systems are common where a separate actuator is employed strictly for the cove lip door which deflects its upwardly upon actuation of the flap assembly. Mechanical lingake systems are also common where, upon movement of the flap assembly into the braking position, the cove lip door is deflected upwardly and held in such a position by means of a mechanical linkage arrangement connectced to the flap.

In the designing of aircraft there are two primary considerations, the first one being to minimize weight and the second being to conserve space. In the above referred to types of flap assemblies no real effort has been made to minimize weight or conserve space. Usually both the flap and the cove lip door have separate actuating mechanisms. There has been no attempt in the prior art to cause a single part to perform more than one function.

Summary of the invention

The apparatus of this invention is a particular double slotted flap arrangement for aircraft wherein: (1) The supporting brackets connecting the vane to the flap also serve the dual function of a cam means controlling the movement of the cove lip door; (2) The cove lip door is constantly biased toward the deflected position and so deflects upon actuation of the flap; and (3) The inclusion of a separate door located directly forward of the cove lip door which permits easy access into the interior portion of the wing where the vane is stored in its non-actuated position.

It is a principle object of the present invention to provide a new slotted flap arrangement which is adaptable to fit all aircraft wing areas including those where it would be otherwise impossible or impractical to use conventional flap arrangements due to lack of space for the flap actuating mechanism.

Another object of the present invention is to provide a slotted flap arrangement which is simple in construction and lighter in weight as well as more compact than those previously known.

Another object of the present inventioin is where the supporting brackets for the vane also are employed as a camming surface to control movement of the cove lip door.

Another object of the present invention is to provide a flap assembly wherein no separate actuation mechanism is necessary for the cove lip door.

Another object of the present invention is to provide a flap assembly wherein a physical attachment between the cove lip door and the flap is not necessary.

Another object of the invention is where the cove lip door has been hinged to an access door to permit easy accessibility to the interior portion of the aircraft wing.

It is believed that other objects of the invention will become apparent and will be better understood from the detailed description which is to follow.

Brief description of the drawings

FIGURE 1 is a perspective view showing a typical type of aircraft in which the mechanism of applicant's invention could be readily employed;

FIGURE 2 is a sectional side view through one of the airplane's wings of FIGURE 1 showing the flap assembly in the non-actuated position;

FIGURE 3 is a view similar to FIGURE 2 in which the flap assembly is shown in the partially actuated position;

FIGURE 4 is a view taken along lines 4—4 in FIGURE 2 showing a plan view of the cove lip door and access door assembly; and FIGURE 5 is a side sectional view of the cove lip door and access door in which the door arrangement is shown with the access door depicted in both the open and closed positions.

Description of the shown embodiment

Referring specifically to FIGURE 1, there is shown an aircraft 10 having a fuselage 12, wings 14 and 16, engines 18 and an empennage 20. Located on the trailing edge portion of each of the wings 14 and 16 are flap assemblies 22 and 24, respectively. Each of the flap assemblies 22 and 24 are substantially identical and this invention will be described in conjunction with wing 14, it being understood that this invention is to be employed on both flap assemblies 22 and 24.

Referring specifically to FIGURE 2, there is shown a sectional view of the aircraft wing 14 and a sectional view of the flap assembly 22. Flap assembly 22 includes flap 26 which can be actuated downward away from the airfoil configuration of the aircraft wing 14. Connected to the leading edge portion of the flap 26 through brackets 28 is a vane 30. It is readily apparent that a substantial hiatus 32 is formed between the vane 30 and the flap 26, the brackets 28 being positioned within the hiatus 32.

Connected to the lower surface of the wing 14, and so mounted to continue the lower surface of the wing 14 between the wing 14 and the flap 26, are an access door 34 and a cove lip door 36. Access door 34 is connected to the wing 14 through a first hinge 38. Cove lip door 36 is connected to the aft portion of access door 34 by means of a second hinge 40. As is readily shown in the drawing first hinge 38 permits clockwise rotation of access door. 34 and second hinge 40 permits counter clockwise rotation of cove lip door 36.

Connected between cove lip door 36 and access door 34 are a pair of torsion bars 42 and 44. Torsion bars 42 and 44 are mounted substantially in line with the hinging axis of second hinge 40. One of the extremities of each of the torsion bars 42 and 44 is fixedly secured by brackets 46 to cove lip door 36. The other extremities of the torsion bars 42 and 44 are fixedly secured to the access door by means of plate 50. The torsion bars are mounted so that, with the cove lip door 36 in the position shown in FIGURE 2 the door is under a constant bias toward the deflected position as shown in FIGURE 3. The movement of the cove lip door 36 is limited by means of stop 52.

Located on the free edge of the cove lip door 36 is a seal 54. Seal 54 is formed of a non-metallic material such as rubber or the like and functions to form a substantially air tight connection with the flap 26 when the flap 26 is in the stowed or non-actuated position. Also, located adjacent the free edge of cove lip door 36 and at spaced intervals therealong, are rollers 56. Rollers 56 remain in contact with a portion of brackets 28 with the flap 26 located in the stowed position. Rollers 56 are to cooperate with camming surface 58 of brackets 28 when the flap 26 is being moved to function as an air brake. When the rollers 56 reach the extremity of the camming surfaces 58, the cove lip door 36 abuts stop 52. In this position cove lip door 36 is sufficiently deflected to permit maximum air flow from the undersurface of the wing 14 through hiatus 32. The flap 26 as shown in FIGURE 3 has been actuated sufficiently so cove lip door 36 abuts stop 52. However, it is to be noted that flap 26 will be further displaced so camming surfaces 38 of brackets 28 will become disassociated with rollers 56. As the flap 26 is moved from its fully actuated position back toward its stowed position, when flap 26 reaches the position shown in FIGURE 3 the rollers 56 will again come in contact with its respective camming surface 58.

The operation of the invention is as follows: As the flap 26 (by mechanism not shown) is moved from the position depicted in FIGURE 2, cove lip door 36 deflects upwardly under the bias of the torsion bars 42 and 44. It is to be understood that movement of cove lip door 36 is directly progressive and corresponds to the progressive movement of flap 26. With the flaps in the fully extended position (not shown) air flow is easily permitted through the hiatus 32 which is between the vane 30 and the flap 26. This air flow from the lower surface of the wing causes the flap 26 to function as an airfoil separate from the wing itself. Therefore, flap 26 has a certain amount of aerodynamic lift which would be lost if there were no hiatus between the vane 30 and flap 26. The deflection of cove lip door 36 facilitates the passage of air flow through hiatus 32.

It is believed that the inventive concepts of this invention have been adequately described in the foregoing. It is to be understood that this flap assembly could be employed on any aircraft wherein such as type of assembly is desired. It is evident that considerable modifications and elaborations of the subject invention can be carried out with regard to the various features of the invention without departing from the scope and spirit thereof. The inventive concepts disclosed herein are to be limited only by a fair and just interpretation of the following claims.

I claim:
1. An aircraft wing structure having a deployable flap assembly mounted thereon to function as an air brake, said flap assembly comprising:
   a main flap portion;
   a vane positioned apart from said main flap portion to permit passage of air therethrough;
   bracket means connecting said vane to the forwardmost edge of said flap, said bracket means includes a fully concave camming surface;
   a cove lip door pivotally connected to the lower surface of said wing and forming a substantially continuous surface between said wing structure and said main flap portion, said cove lip door being capable of moving from a close position to an open position;
   low friction rolling means mounted on said cove lip door, said rolling means being adapted to engage said fully concave camming surface to facilitate movement of said cove lip door from the close position to the open position;
   biasing means for continuously biasing said cove lip door from the close position towards the open position, said cove lip door automatically moves from the close position to the open position upon actuation of said main flap portion, thereby facilitating air flow through the space between said vane and said main flap portion; and
   stop means for maintaining said cove lip door in said open position in opposition to the force exerted by said biasing means.

2. An apparatus as defined in claim 1 wherein said biasing means comprises at least one torsion bar.

3. An apparatus as defined in claim 1 wherein:
   said cove lip door being pivotally connected to an access door, said access door being pivotally connected to said wing, whereby said access door is capable of permitting ease of entry into the interior of said wing.

References Cited
UNITED STATES PATENTS

| 2,006,391 | 7/1935 | Granville | 244—42 |
| 2,169,416 | 8/1939 | Griswold | 244—42 |
| 2,556,326 | 6/1951 | Grant | 244—42 |
| 2,836,380 | 5/1958 | Pearson | 244—42 |
| 3,145,950 | 8/1964 | Circenis | 244—42 |

MILTON BUCHLER, Primary Examiner

J. L. FORMAN, Assistant Examiner